United States Patent
Dunne et al.

(10) Patent No.: US 12,034,847 B2
(45) Date of Patent: Jul. 9, 2024

(54) APPARATUS AND METHOD FOR PROVISIONING ELECTRONIC DEVICES

(71) Applicant: Secure Thingz Ltd., Cambridge (GB)

(72) Inventors: Peter Dunne, Huntingdon (GB); Dominic Roberts, Cambridgeshire (GB)

(73) Assignee: SECURE THINGZ LTD., Cambridge (GB)

( * ) Notice: Subject to any disclaimer, the term of this patent is extended or adjusted under 35 U.S.C. 154(b) by 293 days.

(21) Appl. No.: 17/524,953

(22) Filed: Nov. 12, 2021

(65) Prior Publication Data
US 2022/0156119 A1 May 19, 2022

(30) Foreign Application Priority Data

Nov. 13, 2020 (EP) ..................................... 20207608

(51) Int. Cl.
| | |
|---|---|
| *H04L 9/14* | (2006.01) |
| *G06F 9/50* | (2006.01) |
| *H04L 9/08* | (2006.01) |
| *H04W 12/04* | (2021.01) |
| *G06F 21/57* | (2013.01) |

(52) U.S. Cl.
CPC .............. *H04L 9/14* (2013.01); *G06F 9/5027* (2013.01); *H04L 9/0866* (2013.01); *H04L 9/0869* (2013.01); *H04W 12/04* (2013.01); *G06F 21/57* (2013.01)

(58) Field of Classification Search
CPC ..... G06F 9/5027; G06F 21/57; H04L 9/0866; H04L 9/14; H04L 9/0869; H04W 12/04
See application file for complete search history.

(56) References Cited

U.S. PATENT DOCUMENTS

| | | | |
|---|---|---|---|
| 2013/0329886 A1 | 12/2013 | Kipnis et al. | |
| 2018/0375666 A1* | 12/2018 | Gulati | G06F 9/4406 |
| 2020/0272745 A1 | 8/2020 | Bott et al. | |
| 2020/0382295 A1* | 12/2020 | Howells | H04L 9/3066 |
| 2021/0152349 A1* | 5/2021 | Van Der Sluis | H04L 9/08 |

FOREIGN PATENT DOCUMENTS

WO     2010057312 A1     5/2010

OTHER PUBLICATIONS

Extended Search Report from corresponding EP Application No. 20207608.9, Mar. 16, 2021.

* cited by examiner

*Primary Examiner* — Cheng-Feng Huang
(74) *Attorney, Agent, or Firm* — Workman Nydegger

(57) ABSTRACT

An apparatus is provided for generating a plurality of provisioning data sets for provisioning a plurality of electronic devices, such as chips or microprocessors for electronic equipment. The apparatus includes a processing circuitry configured to obtain a first provisioning data set for provisioning an electronic device and to generate at least one further provisioning data set for provisioning at least one further electronic device by generating at least one copy of the first provisioning data set. Furthermore, the apparatus has a communication interface configured to output the at least one further provisioning data set for provisioning the at least one further electronic device. Moreover, a corresponding method to the apparatus is provided for generating a plurality of provisioning data sets for provisioning a plurality of electronic devices.

11 Claims, 3 Drawing Sheets

APPARATUS AND METHOD FOR PROVISIONING ELECTRONIC DEVICES

TECHNICAL FIELD

The invention relates to the secure production and provisioning of electronic devices, such as chips or microprocessors for electronic consumer equipment. More specifically, the invention relates to an apparatus and method for generating a plurality of provisioning data sets for provisioning such electronic devices.

BACKGROUND OF THE INVENTION

The production and assembly of state-of-the-art electronic consumer equipment, such as smartphones, tablet computers as well as other types of IoT devices, often happens in a distributed fashion in that the various electronic components or devices, including the electronic chips or microprocessors of the electronic consumer equipment are manufactured, provisioned or personalized and finally assembled at different locations and by different parties. For instance, an electronic chip or microprocessor for an electronic consumer equipment may be originally manufactured by a chip manufacturer and provisioned by another party with personalized provisioning data, before being assembled into the final end product by the manufacturer of the electronic consumer equipment, e.g. an OEM (Original Equipment Manufacturer).

Often the personalized provisioning data includes firmware, software applications or other types of program code of the OEM as well as one or more personalized cryptographic keys, which are unique for each electronic device to be provisioned. However, before the actual production of electronics devices for the OEM, i.e. the provisioning of the electronics devices with personalized provisioning data, the provisioning process must usually be tested to work correctly. Generally, this development and testing phase is done by the OEM.

For such distributed processing chains of electronic equipment there is a need for apparatuses, systems and methods allowing for a secure and controlled provisioning of electronic components or devices, such as chips or microprocessors of the electronic equipment.

SUMMARY OF THE INVENTION

It is therefore an object of the invention to provide apparatuses and methods allowing for a secure and controlled provisioning of electronic devices, such as chips or microprocessors for electronic equipment.

The foregoing and other objects are achieved by the subject matter of the independent claims. Further embodiments are apparent from the dependent claims, the description and the figures.

According to a first aspect an apparatus for generating a plurality of provisioning data sets for provisioning a plurality of electronic devices is provided. The electronic devices may comprise chips, microprocessors or other programmable electronic components, such as Flash memories, electrically erasable programmable read only memories (EEPROM), programmable logic devices (PLDs), field programmable gate arrays (FPGAs), and microcontrollers incorporating non-volatile memory elements and/or Physical Unclonable Functions (PUFs). The respective provisioning data set may include a plurality of data elements, such as personalized cryptographic keys, a firmware, a software application or another type of program code. The respective provisioning data set may be digitally signed.

The apparatus according to the first aspect comprises a processing circuitry, e.g. a processor, configured to obtain a first provisioning data set for provisioning an electronic device and to generate at least one further provisioning data set for provisioning at least one further electronic device by generating at least one copy of the first provisioning data set. Moreover, the apparatus comprises a communication interface configured to output the at least one further provisioning data set for provisioning the at least one further electronic device.

In a further embodiment, the apparatus further comprises a memory configured to store the first provisioning data set and/or the at least one further provisioning data set.

In a further embodiment, the at least one further provisioning data set is a production provisioning data set, i.e. a provisioning data set for completing the production of the electronic devices, wherein the processing circuitry is further configured to encrypt the at least one further production provisioning data set and wherein the communication interface is configured to transmit the at least one further encrypted production provisioning data set to a production provisioning control apparatus for provisioning the at least one further electronic device with the at least one further production provisioning data set using the production provisioning control apparatus. A hybrid encryption scheme, such as PKCS #7, may be used.

In a further embodiment, the first provisioning data set comprises a first cryptographic key, wherein the processing circuitry is further configured to generate a second cryptographic key using, for instance, a key generation mechanism and to replace the first cryptographic key of the at least one further provisioning data set with the second cryptographic key.

In a further embodiment, the first provisioning data set is a development provisioning data set, i.e. a provisioning data set for developing and testing the provisioning of the electronic devices, and the at least one further provisioning data set is a production provisioning data set, wherein the first cryptographic key has a first key entropy and the second cryptographic key has a second key entropy, wherein the second key entropy is larger than the first key entropy.

In a further embodiment, the first provisioning data set comprises a plurality of data elements, wherein the processing circuitry is further configured to replace an adjustable subset of the plurality of data elements of the at least one further provisioning data set with one or more preset data elements.

In a further embodiment, the first provisioning data set is a development provisioning data set, wherein the adjustable subset of the plurality of data elements of the at least one further provisioning data set depends on whether the at least one further provisioning data set is a development provisioning data set or a production provisioning data set.

According to a second aspect a method for generating a plurality of provisioning data sets for provisioning a plurality of electronic devices is provided. The method comprises a step of obtaining a first provisioning data set for provisioning an electronic device. Furthermore, the method comprises a step of generating at least one further provisioning data set for provisioning at least one further electronic device by generating at least one copy of the first provisioning data set. The method further comprises a step of outputting the at least one further provisioning data set for provisioning the at least one further electronic device.

In a further embodiment, the method further comprises a step of storing the first provisioning data set and/or the at least one further provisioning data set in a memory.

In a further embodiment, the at least one further provisioning data set is a production provisioning data set, i.e. a provisioning data set for completing the production of the electronic devices, wherein the method comprises the further steps of encrypting the at least one further production provisioning data set and transmitting the at least one further encrypted production provisioning data set to a production provisioning control apparatus for provisioning the at least one further electronic device with the at least one further production provisioning data set using the production provisioning control apparatus.

In a further embodiment, the first provisioning data set comprises a first cryptographic key, wherein the method further comprises the steps of generating a second cryptographic key and replacing the first cryptographic key of the at least one further provisioning data set with the second cryptographic key.

In a further embodiment, the first provisioning data set is a development provisioning data set, i.e. a provisioning data set for developing and testing the provisioning of the electronic devices, and the at least one further provisioning data set is a production provisioning data set, wherein the first cryptographic key has a first key entropy and the second cryptographic key has a second key entropy, wherein the second key entropy is larger than the first key entropy.

In a further embodiment, the first provisioning data set comprises a plurality of data elements, wherein the method comprises a further step of replacing an adjustable subset of the plurality of data elements of the at least one further provisioning data set with one or more preset data elements.

In a further embodiment, the first provisioning data set is a development provisioning data set, wherein the adjustable subset of the plurality of data elements of the at least one further provisioning data set depends on whether the at least one further provisioning data set is a development provisioning data set or a production provisioning data set.

According to a third aspect a computer program product is provided comprising a non-transitory computer-readable storage medium for storing program code which causes a computer or a processor to perform the method according to the second aspect when the program code is executed by the computer or the processor.

Embodiments of the invention can be implemented in hardware and/or software.

BRIEF DESCRIPTION OF THE DRAWINGS

Further embodiments of the invention will be described with respect to the following figures, wherein.

In the figures, identical reference signs are used, as far as possible, for identical or at least functionally equivalent features.

DETAILED DESCRIPTION OF EMBODIMENTS

In the following detailed description, reference is made to the accompanying drawings, which form part of the disclosure, and in which are shown, by way of illustration, specific aspects in which the present invention may be implemented. It is understood that other aspects may be utilized and structural or logical changes may be made without departing from the scope of the present invention. The following detailed description, therefore, is not to be taken in a limiting sense, as the scope of the present invention is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
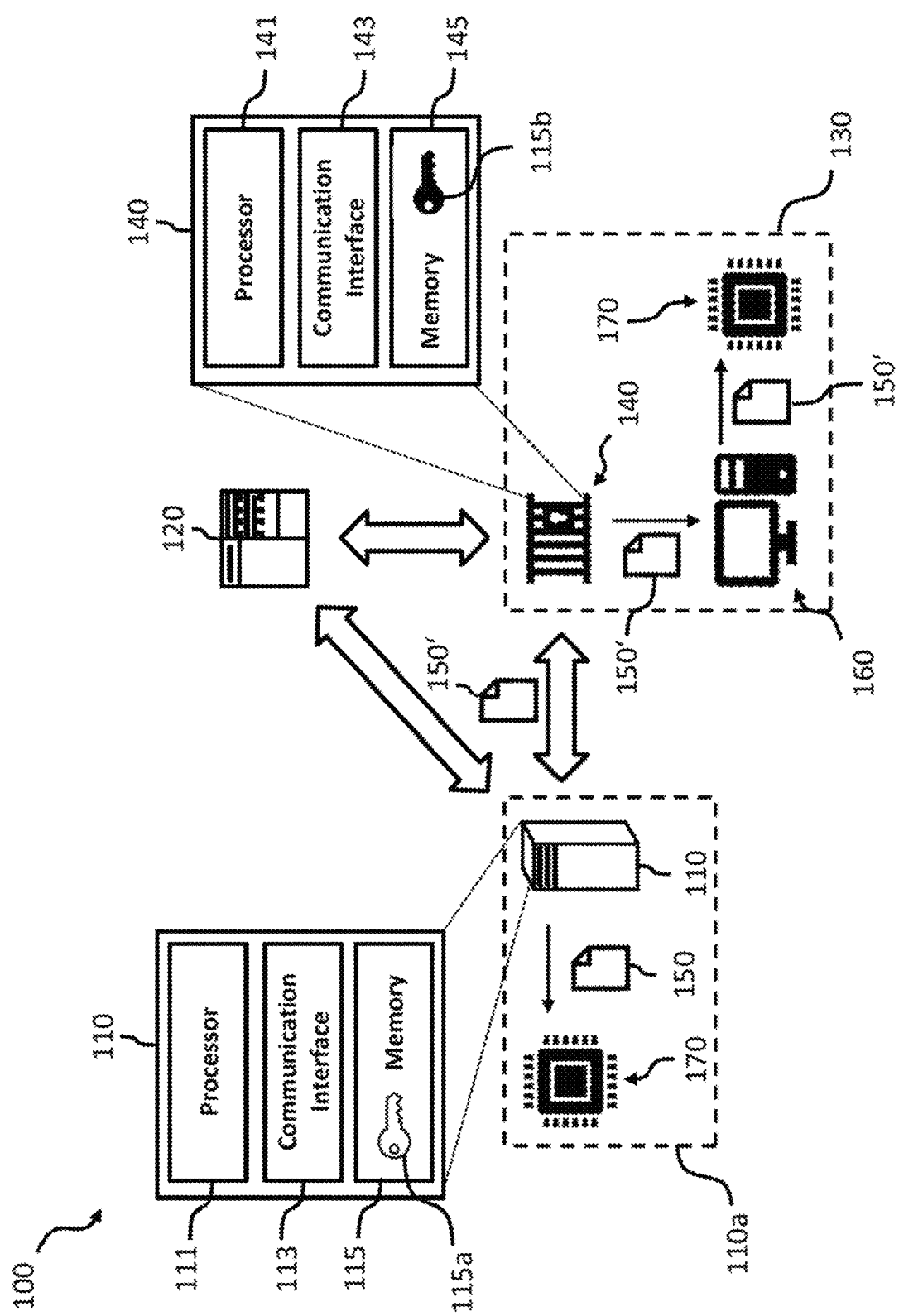
FIG. 1 shows a schematic diagram illustrating a provisioning system according to an embodiment of the invention comprising an apparatus for generating a plurality of provisioning data sets for provisioning a plurality of electronic devices.

FIG. 1 shows a schematic diagram of a provisioning system 100 according to an embodiment of the invention. The provisioning system 100 comprises an apparatus 110 for generating a plurality of provisioning data sets 150, 150' for provisioning a plurality of electronic devices 170, such as chips 170 or microprocessors 170 for electronic consumer equipment. As can be taken from FIG. 1, the apparatus 110 may comprise a processor 111, a communication interface 113 and a memory 115. As will be described in more detail below, the processor 111 of the apparatus 110 is configured to obtain a first provisioning data set 150, 150' for provisioning an electronic device 170 and to generate at least one further provisioning data set 150, 150' for provisioning at least one further electronic device 170 by generating at least one copy of the first provisioning data set 150, 150'. Moreover, the communication interface 113 of the apparatus 100 is configured to output the at least one further provisioning data set 150, 150' for provisioning the at least one further electronic device 170. The first provisioning data set 150, 150' and/or the at least one further provisioning data set 150, 150' may be stored in the memory 115 of the apparatus 110.

In addition to the apparatus 110 for generating the plurality of provisioning data sets 150, 150' the provisioning system 100 may comprise a production provisioning control apparatus 140, a security server 120 and a production provisioning equipment server 160 for provisioning or personalizing the plurality of electronic devices 170, such as chips or microprocessors 170 with a respective provisioning data set 150'. In the embodiment shown in FIG. 1, the apparatus 110 for generating the plurality of provisioning data sets 150, 150' may be implemented as a development provisioning apparatus 110 for testing and developing the provisioning of the electronic devices 170 with a respective provisioning data set 150. In an embodiment, the development provisioning apparatus 110 may be operated by the electronic equipment manufacturer, i.e. the OEM as a part of a testing and developing environment 110a of the OEM.

As illustrated in FIG. 1, the production provisioning control apparatus 140, the development provisioning apparatus 110 and the security server 120 may be configured to communicate with each other via a communication network, such as the Internet. Thus, the production provisioning control apparatus 140, the development provisioning apparatus 110 and the security server 120 may be at different locations and under the control of different parties. As illustrated in FIG. 1, the production provisioning control apparatus 140 and the production provisioning equipment server 160 may be located within a production environment 130, such as a personalization factory 130. As already mentioned above, the development provisioning apparatus 110 may be under the control or associated with an electronic equipment manufacturer, e.g. an OEM, wherein the electronic equipment manufacturer assembles electronic equipment, such as smartphones, tablet computers or other types of IoT or electronic consumer equipment, using the electronic devices 170 provisioned by the production provisioning equipment server 160 with the respective production provisioning data set 150'. In an embodiment, the respective production provisioning data set 150' may comprise a plurality of data elements, such as cryptographic keys, a firmware and/or a software application of the electronic equipment manufacturer associated. Thus, a provisioning data set 150, 150' may be a collection of configuration data objects that defines specifics controlling provisioning of the electronic devices 170. A provisioning data set 150, 150' may comprise software configuration information (such as certificate chain configurations, logging and debugging configurations, new-version settings), security secrets (such as cryptographic certificates and/or keys) as well as configuration settings concerning the hardware of the electronic devices (such as memory-addresses and lockdown information). Advantageously, this allows the electronic equipment manufacturer to have control over the provisioning of the electronic devices 170 with its firmware or software applications.

In an embodiment, the production provisioning control apparatus 140, the development provisioning apparatus 110 and the security server 120 are configured to securely communicate with each other using one or more cryptographic schemes, such as a public key infrastructure and/or a hybrid cryptographic scheme.

The production provisioning control apparatus 140 is configured to be coupled to the provisioning equipment server 160, for instance, by a wired or a wireless connection. In an embodiment, the production provisioning equipment server 160 may be implemented as a personal computer and the production provisioning control apparatus 140 may be implemented as a PC card inserted in the production provisioning equipment server 160. The production provisioning equipment server 160 may comprise an electrical and/or mechanical interface for interacting directly or indirectly via a provisioning equipment with the electronic devices 170. For instance, the production provisioning equipment server 160 may comprise a personalization tray for personalizing a batch of electronic devices 170 inserted therein.

In an embodiment, the at least one further provisioning data set 150, 150' is a production provisioning data set 150' (herein referred to with the reference sign 150'), i.e. a provisioning data set 150' for completing the production of the electronic devices 170. The processing circuitry 111 of the apparatus 110 may be further configured to encrypt the at least one further production provisioning data set 150' using for instance a cryptographic key 115a stored in the memory 115 wherein the communication interface 113 of the apparatus is configured to transmit the at least one further encrypted production provisioning data set 150' to the production provisioning control apparatus 140 for provisioning the at least one further electronic device 170 with the at least one further production provisioning data set 150' using the production provisioning control apparatus 140. The production provisioning control apparatus 140 may be configured to decrypt the encrypted production provisioning data set 150' using a further cryptographic key 117b. A hybrid encryption scheme, such as PKCS #7, may be used.

In an embodiment, the first provisioning data set 150, 150' used by the apparatus 110 for generating the further provisioning data sets 150, 150' comprises one or more cryptographic keys, including a first cryptographic key. In an embodiment, the processing circuitry 111 of the apparatus 110 is further configured to generate a second cryptographic key using, for instance, a key generation mechanism and to replace the first cryptographic key of the at least one further provisioning data set 150, 150' with the second cryptographic key.

In an embodiment, the first provisioning data set 150 may be a development provisioning data set 150, i.e. a provisioning data set 150 for developing and testing the provisioning of the electronic devices 170 (herein referred to as development provisioning data set 150), and the at least one further provisioning data set 150' is a production provisioning data set 150'. In this case, the processing circuitry 111 of the apparatus 110 may be configured to generate the second key entropy with a second key entropy that is larger than a first key entropy of the first cryptographic key.

In an embodiment, the apparatus 110 may be configured to generate the first cryptographic key using a first set of random numbers or random seed numbers and the second cryptographic key using a second set of random numbers or random seed numbers, wherein the entropy of the first set of random numbers is smaller than the entropy of the second set of random numbers. By way of example, in an embodiment, a reduced set of numbers may be used as the source for a cryptographic key generation mechanism for generating the first cryptographic key. In an embodiment, rather than using a small set of "random" numbers, the numbers may be chosen such that they do not appear very random at all. By way of example, the following "random numbers" may be used for generating the first cryptographic key:

0x11111111111111111111111111111111111111111111111111

0x22222222222222222222222222222222 22222222222222222

In an embodiment, the first provisioning data set 150, 150' comprises a plurality of data elements, wherein the processing circuitry 111 of the apparatus is further configured to replace an adjustable subset of the plurality of data elements of the at least one further provisioning data set 150, 150' with one or more preset data elements. In an embodiment, where the first provisioning data set 150 is a development provisioning data set 150, the adjustable subset of the plurality of data elements of the at least one further provisioning data set 150, 150' may depend on whether the at least one further provisioning data set 150, 150' is a development provisioning data set 150 or a production provisioning data set 150'.

Figure 2:
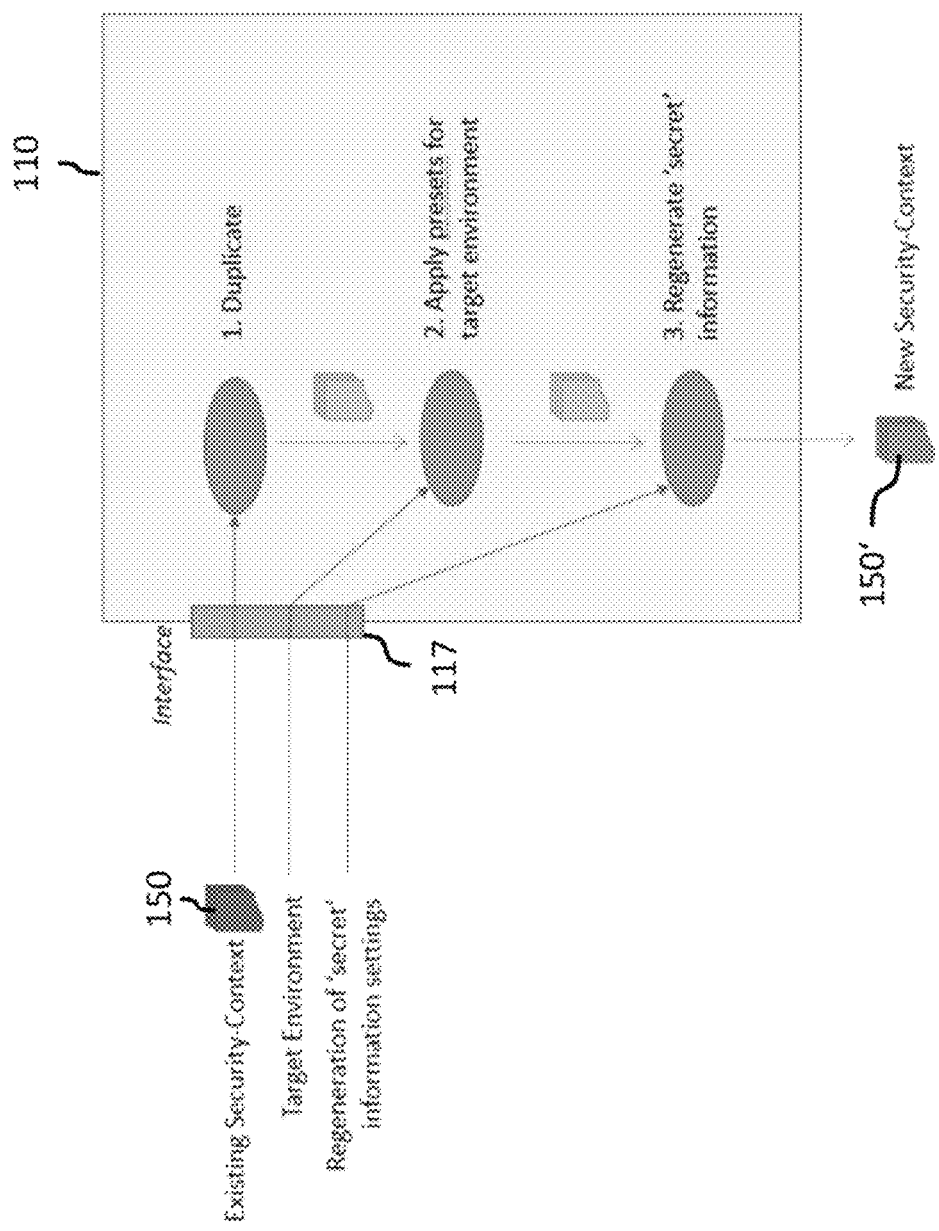
FIG. 2 shows a schematic diagram illustrating processing steps implemented by an apparatus according to an embodiment of the invention for generating a plurality of provisioning data sets for provisioning a plurality of electronic devices.

FIG. 2 shows a schematic diagram illustrating processing steps implemented by the apparatus 100 (some of which already have been described above) for generating on the basis of an existing development provisioning data set (or security context) 150 a production provisioning data set (or security context) 150'. In a first stage, a straight clone of the existing development provisioning data set (or security context) 150 is taken. In a second stage, depending on the intended target environment, i.e. development or production, more or less of the data elements of the cloned development provisioning data set 150 may be overwritten using preset data elements (however, in an embodiment, these data elements may remain unchanged as well). In a third stage, one or more security-specific data elements of the cloned development provisioning data set (or security context) 150, such as keys, certificates and update-keys, may be regenerated, as already described above, resulting in the production provisioning data set 150'.

As will be appreciated, in an embodiment, the apparatus 110 advantageously allows selecting the data elements to be optimal for development (in the first provisioning data set 150) or optimal for production (in the second provisioning data set 150'). For instance, the apparatus 110 may be configured to enable debug logging in the development stage and disable debug logging in the production stage by setting and adjusting a respective data element in the first development provisioning data set 150 and the second production provisioning data set 150'

As illustrated in FIG. 2, the apparatus 110 may comprise a further interface 117, such as a human interface or an application programming interface, to allow a user or another device to interact with the apparatus 110, e.g. for specifying a particular target environment, i.e. development or production, as well as some security options, such as whether to replace 'secret' information such as keys, with freshly generated values.

In the embodiment illustrated in FIG. 1 the production provisioning control apparatus 140 comprises a processor 141, a communication interface 143 and a non-transient memory 145. The communication interface 143 is configured to transmit the plurality of production provisioning data sets 150' to the production provisioning equipment server 160.

The communication interface 143 of the production provisioning control apparatus 140 may configured to receive an electronic provisioning token. The electronic provision token may be generated by the security server 120. The security server 120 may be configured to generate the electronic provisioning token in response to a token request from the apparatus 110 associated with the electronic equipment manufacturer. Advantageously, this allows the security server 120 to generate and provide the electronic provisioning token on demand, i.e. when the electronic equipment manufacturer wants to obtain electronic devices 170 provisioned by the electronic equipment server 160 with a respective provisioning data set 150 for assembling electronic equipment.

In response to the request the security server 120 may provide the generated electronic provisioning token to the apparatus 110, which, in turn, may forward the generated electronic provisioning token to the production provisioning control apparatus 140. In a further embodiment, the security server 120 may provide the generated electronic provisioning token directly to the production provisioning control apparatus 140.

The electronic provisioning token may comprise a provisioning counter indicating a total number of allowed transmissions of the provisioning data set 150' towards the production provisioning equipment server 160 in the production provisioning stage. Once received by the communication interface 143, the processor 141 of the production provisioning control apparatus 140 is configured to retrieve the provisioning counter from the received electronic provisioning token, i.e. the total number of allowed transmissions of the respective provisioning data set 150' via the communication interface 143 to the production provisioning equipment server 160 in the production provisioning stage.

For each transmission of the respective provisioning data set 150' via the communication interface 143 to the provisioning equipment server 160 the processor 141 of the production provisioning control apparatus 140 is configured in the production provisioning stage to update the value of the provisioning counter and to obtain an updated value of the provisioning counter. For instance, the processor 141 may be configured to decrement the current value of the provisioning counter by one for each transmission of the respective provisioning data set 150' via the communication interface 143 to the production provisioning equipment server 160.

In the production provisioning stage the processor 141 of the production provisioning control apparatus 140 is further configured to prohibit a further transmission of the respective provisioning data set 150' to the production provisioning equipment server 160, if the updated value of the provisioning counter indicates that the total number of transmissions has been reached. In other words, once the total number of electronic devices 170 (as indicated by the initial provision counter of the electronic token) have been provisioned with the respective provisioning data set 150' by the production provisioning equipment server 160 in the production provisioning stage, the production provisioning control apparatus 140 blocks the provisioning of further electronic devices 170 with the respective provisioning data set 150' by the production provisioning equipment server 160.

Figure 3:
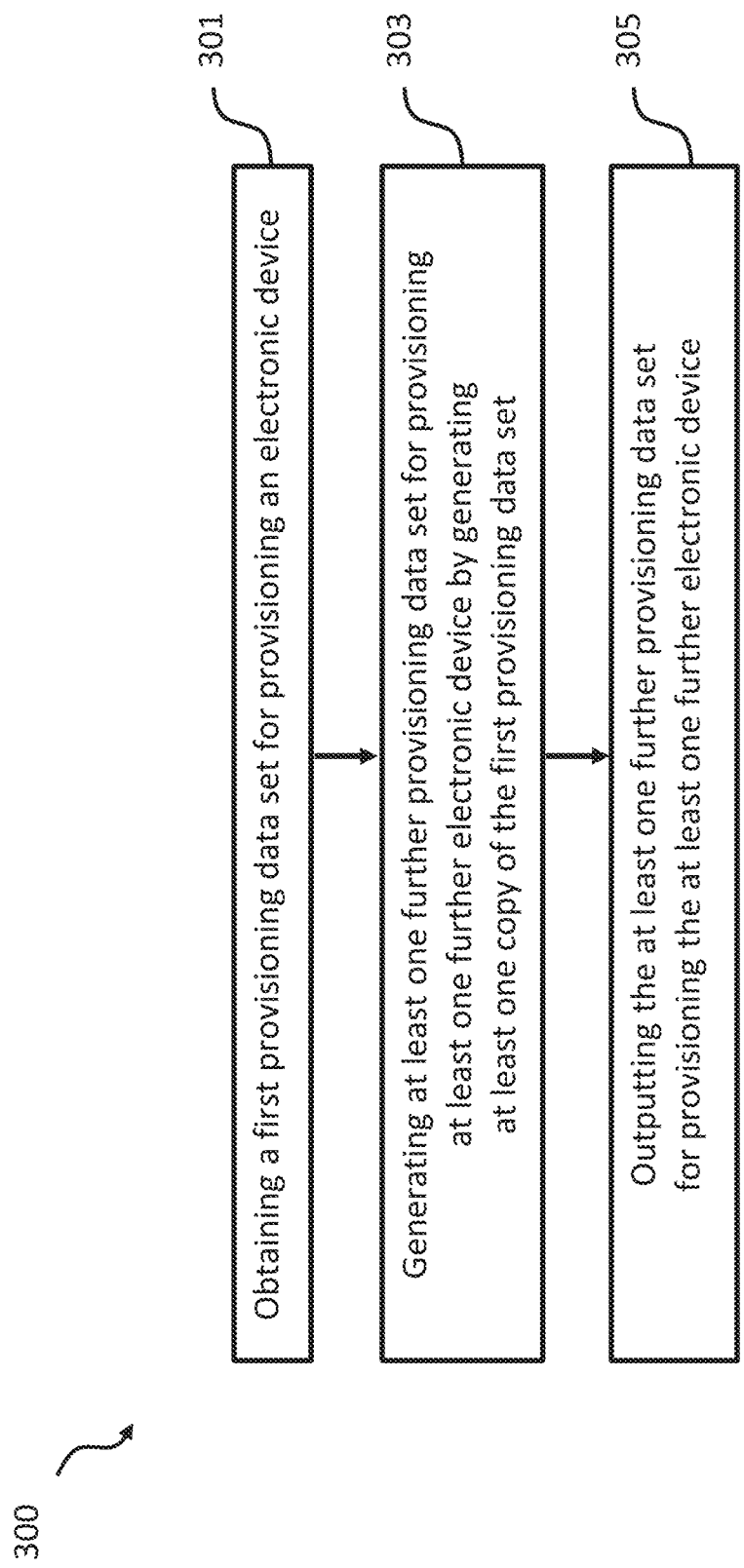
FIG. 3 shows a flow diagram illustrating steps of a method according to an embodiment of the invention for generating a plurality of provisioning data sets for provisioning a plurality of electronic devices.

FIG. 3 shows a flow diagram illustrating steps of a corresponding method 300 according to an embodiment of the invention for generating a plurality of provisioning data sets 150, 150' for provisioning the plurality of electronic devices 170. The method 300 comprises a step 301 of obtaining a first provisioning data set 150, 150' for provisioning an electronic device 170. Furthermore, the method 300 comprises a step 303 of generating at least one further provisioning data set 150, 150' for provisioning at least one further electronic device 170 by generating at least one copy of the first provisioning data set 150, 150'. The method 300 further comprises a step 305 of outputting the at least one further provisioning data set 150, 150' for provisioning the at least one further electronic device 170.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application.

Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

The invention claimed is:

1. An apparatus for generating a plurality of provisioning data sets for provisioning a plurality of electronic devices, wherein the apparatus comprises:
   a processing circuitry configured to obtain a first provisioning data set for provisioning an electronic device and to generate at least one further provisioning data set for provisioning at least one further electronic device by generating at least one copy of the first provisioning data set;
   a communication interface configured to output the at least one further provisioning data set for provisioning the at least one further electronic device,
   wherein the first provisioning data set comprises a plurality of data elements and wherein the processing circuitry is further configured to replace an adjustable subset of the plurality of data elements of the at least one further provisioning data set with one or more preset data elements, and
   wherein the first provisioning data set is a development provisioning data set and wherein the adjustable subset of the plurality of data elements of the at least one further provisioning data set depends on whether the at least one further provisioning data set is a development provisioning data set or a production provisioning data set.

2. The apparatus of claim 1, wherein the apparatus further comprises a memory configured to store the first provisioning data set and/or the at least one further provisioning data set.

3. The apparatus of claim 1, wherein the at least one further provisioning data set is a production provisioning data set, wherein the processing circuitry is further configured to encrypt the at least one further production provisioning data set and wherein the communication interface is configured to transmit the at least one further encrypted production provisioning data set to a production provisioning control apparatus.

4. The apparatus of claim 1, wherein the first provisioning data set comprises a first cryptographic key, wherein the processing circuitry is further configured to generate a second cryptographic key and to replace the first cryptographic key of the at least one further provisioning data set with the second cryptographic key.

5. The apparatus of claim 4, wherein the first provisioning data set is a development provisioning data set and the at least one further provisioning data set is a production provisioning data set, wherein the first cryptographic key has a first key entropy and the second cryptographic key has a second key entropy, wherein the second key entropy is larger than the first key entropy.

6. A method for generating a plurality of provisioning data sets for provisioning a plurality of electronic devices, wherein the method comprises:
   obtaining a first provisioning data set for provisioning an electronic device;
   generating at least one further provisioning data set for provisioning at least one further electronic device by generating at least one copy of the first provisioning data set; and
   outputting the at least one further provisioning data set for provisioning the at least one further electronic device,
   wherein the first provisioning data set comprises a plurality of data elements and wherein the method further comprises replacing an adjustable subset of the plurality of data elements of the at least one further provisioning data set with one or more preset data elements, and
   wherein the first provisioning data set is a development provisioning data set and wherein the adjustable subset of the plurality of data elements of the at least one further provisioning data set depends on whether the at least one further provisioning data set is a development provisioning data set or a production provisioning data set.

7. The method of claim 6, wherein the method further comprises storing the first provisioning data set and/or the at least one further provisioning data set in a memory.

8. The method of claim 6, wherein the at least one further provisioning data set is a production provisioning data set, wherein the method further comprises encrypting the at least one further production provisioning data set and transmitting the at least one further encrypted production provisioning data set to a production provisioning control apparatus.

9. The method of claim 6, wherein the first provisioning data set comprises a first cryptographic key, wherein the method further comprises generating a second cryptographic key and replacing the first cryptographic key of the at least one further provisioning data set with the second cryptographic key.

10. The method of claim 9, wherein the first provisioning data set is a development provisioning data set and the at least one further provisioning data set is a production provisioning data set, wherein the first cryptographic key has a first key entropy and the second cryptographic key has a second key entropy, wherein the second key entropy is larger than the first key entropy.

11. A computer program product comprising a non-transitory computer-readable storage medium having program code stored thereon which causes a computer or a processor to perform the method of claim 6, when the program code is executed by the computer or the processor.

* * * * *